United States Patent [19]

Chapman

[11] 3,901,442
[45] Aug. 26, 1975

[54] SUSPENSION DISTRIBUTION SYSTEM
[75] Inventor: John A. Chapman, Wahoo, Nebr.
[73] Assignee: Valmont Industries, Inc., Valley, Nebr.
[22] Filed: Aug. 19, 1974
[21] Appl. No.: 498,304

[52] U.S. Cl. ............. 239/99; 137/624.18; 239/177
[51] Int. Cl.² .............................................. B05B 3/12
[58] Field of Search ............... 239/177, 212, 11, 99; 137/344, 624.2, 624.18

[56] References Cited
UNITED STATES PATENTS

| | | | |
|---|---|---|---|
| 3,493,176 | 2/1970 | Kinkead | 239/177 X |
| 3,536,261 | 10/1970 | Van Den Brink | 239/177 |
| 3,669,353 | 6/1972 | Hanson et al. | 239/177 |

Primary Examiner—Lloyd L. King
Assistant Examiner—Michael Mar
Attorney, Agent, or Firm—Kinzer, Plyer, Dorn & McEachran

[57] ABSTRACT

A center pivot agricultural liquid distribution system for distributing a liquid suspension containing solid particles substantially uniformly over a segmental circular area traced by an elongated distribution conduit extending radially from a central pivot point in a field, a limited number of discharge nozzles, each larger than the maximum size particle, are located at spaced intervals along the conduit, each nozzle having an actuator to open and close the nozzle. A control operates the nozzle actuators in accordance with a repetitive timing cycle; the innermost nozzle is open for only a brief interval, the open intervals being progressively longer for successive outwardly displaced nozzles.

10 Claims, 8 Drawing Figures

SUSPENSION DISTRIBUTION SYSTEM

BACKGROUND OF THE INVENTION

This invention relates generally to center pivot agricultural distribution systems and more particularly concerns a system for distributing a liquid suspension containing solid particles.

Figure 2:
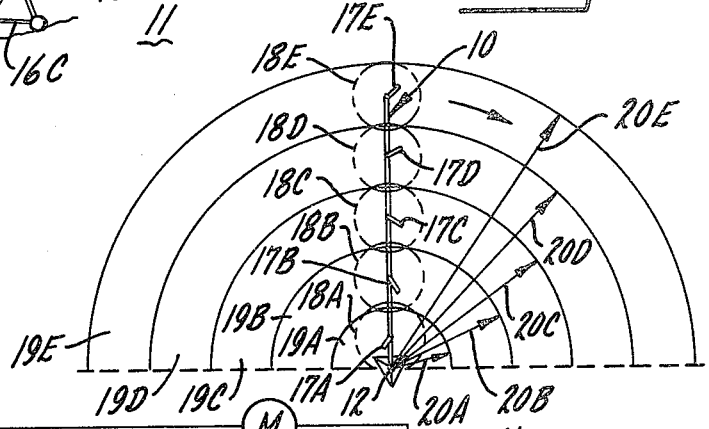

Center pivot irrigation systems have been widely used in many agricultural areas where irrigation is necessary. However, these systems have been employed primarily for distribution of water or of water containing only soluble components. In order to apply the water evenly to the field, different sized outlet nozzles have been utilized. Another known method of providing uniform water distribution is to increase the number of nozzles on the elongated conduit as the distance from the center pivot is increased. These systems work adequately for irrigation; however, they prove inadequate when liquid suspensions containing solid particles must be distributed.

For instance, some fertilizer suspensions may contain solid particles with maximum dimensions of one-half to three-quarters of an inch. Control by varying the nozzle size is thus limited to extremely large nozzle orifices. Since the elongated conduit which extends from the center pivot outward usually has only a 6 inch inside diameter, nozzle orifices larger than an inch are impractical; the pressure drop at the nozzle is too great and localized flooding of the field may occur. Moreover, if a large number of nozzles is employed at the outer end of the conduit, the volume of the liquid suspension from each nozzle changes, which may cause either flooding or inadequate distribution at that part of the system, defeating the objective of even distribution of the liquid suspension.

Accordingly, it is an object of this invention to provide a method and apparatus for distributing liquid suspensions containing solid particles substantially uniformly over the area covered by a center pivot distribution system.

SUMMARY OF THE INVENTION

In accordance with the invention a center pivot agricultural liquid distribution system, of the kind including an elongated distribution conduit extending radially from a central pivot point in a field and drive means for pivoting the conduit about the pivot point to sweep at least a segmental circular area of the field, capable of substantially uniform distribution of a liquid suspension containing solid particles of given maximum dimension over the field area swept by the conduit, comprises a limited number of discharge nozzles mounted on and connected to the conduit at predetermined axially spaced intervals, each adapted to spray the liquid suspension outwardly of the conduit, the spray pattern of each nozzle extending at least to the edge of the spray pattern for the next adjacent nozzle, each discharge nozzle having an internal diameter larger than the maximum particle dimension; the system further includes a corresponding number of nozzle actuators, one actuator being connected to each discharge nozzle to actuate that discharge nozzle between an open discharge condition and a closed condition, and control means for operating the nozzle actuators in accordance with a repetitive timing cycle in which the first discharge nozzle, nearest the pivot point, is maintained in its open discharge condition for a limited incremental portion of each cyclic period, and each successive nozzle, outwardly of the pivot point, is maintained in its open discharge condition for a progressively longer portion of the cyclic period.

BRIEF DESCRIPTION OF THE DRAWINGS

FIG. 1 is a perspective view of a center pivot agricultural liquid distribution system constructed in accordance with the present invention;

FIG. 2 is a plan view of a semi-circular field irrigated by the system of FIG. 1 and may be considered to represent one-half of a full circular field irrigated by that system;

FIG. 3 is a circuit diagram of an electrical control for use in the system of FIGS. 1 and 2;

FIG. 4 is a timing chart employed to explain the operation of the system of FIGS. 1–3;

FIG. 5 is a plan view of a semi-circular field upon which a liquid suspension is distributed by a modification of the system of FIGS. 1–3;

FIG. 6 is a timing chart employed to explain the operation of the system shown in FIG. 5;

FIG. 7 is a plan view of a semi-circular field on which a liquid suspension is distributed by a system comprising a further modification of that shown in FIGS. 1–3; and FIG. 8 is a timing chart utilized to explain the operation of the system shown in FIG. 7.

DETAILED DESCRIPTION OF THE INVENTION

FIG. 1 shows a liquid distribution system 10 embodying some of the features of the instant invention. The liquid distribution system 10 is utilized to spread a liquid suspension containing solid particles on a field 11. Liquid distribution system 10 includes a center pivot 12 which includes a liquid suspension input means 13 through which the desired liquid suspension is pumped from any desired source. Any suitable pumping system and connection system may be utilized.

From the center pivot 12, an elongated distribution conduit 14 extends radially outward; conduit 14 is connected to the liquid suspension input means 13 to allow flow of the liquid suspension through the conduit. Conduit 14 can be made up of sections of large diameter pipe supported by a series of trusses 15. Thus, conduit 14 includes a number of segments 14A, 14B, 14C, and 14D which are sequentially connected to each other. The joints employed may have limited flexibility to accommodate variations in elevation of field 11. A cantilever conduit extension 14E projects outwardly from segment 14D.

Trusses 15 are supported above field 11 by a series of mobile support towers 16A, 16B, 16C, and 16E which are aligned in close proximity with the flexible junctions between the segments of the elongated conduit 14. Each support tower 16A–16D includes an individual drive motor for the tower wheels. These tower drive units constitute a drive means to pivot the entire elongated conduit 14 around central pivot 12. Any conventional or desired drive control may be utilized. A limited number of discharge nozzles 17A, 17B, 17C, 17D and 17E are connected to conduit 14, one nozzle on each of segments 14A–14D and one at the end of the cantilever conduit extension 14E. Nozzles 17A–17E each discharge the liquid suspension in a pattern which extends to or partially overlaps the pattern of the adjacent nozzles.

FIG. 2 shows a plan view of system 10 as utilized to distribute a liquid suspension of field 11. Each nozzle 17A–17E is shown with a spray pattern covering the area between it and the next nozzle. Thus, nozzles 17A–17E have the spray patterns 18A–18E. As conduit 14 is driven around the semi-circular field 11, each of these spray patterns of the nozzles covers a band with a given area. For example, a band 19A or radius 20A is covered by the spray pattern of nozzle 17A. Similarly, the liquid suspension distributed from nozzle 17B covers a band 19B of radius 20B, nozzle 17C covers a band 19C of radius 20C, nozzle 17D covers a band 19D of radius 20D and nozzle 17E covers a band 19E with a radius 20E.

In accordance with the invention, nozzles 17A–17E each have a limiting internal diameter which is larger than the maximum dimension of the solid particles in the liquid suspension. For example, each nozzle may have a 1-inch orifice diameter for distributing suspensions containing solid particles with maximum dimensions of one-half to three-quarters of an inch. The nozzles are preferably of uniform construction, so that each discharges liquid at the same rate. With a conduit 14 of adequate size, friction losses along the length of the conduit can usually be disregarded.

As the distance outwardly from center pivot 12 increases, the area of the band covered by the liquid from each nozzle increases. Thus, in order to provide an even distribution of the liquid suspension throughout field 11, the outer discharge nozzles must be in operation for longer periods of time than the inner nozzles. This is accomplished by a number of nozzle actuators, employed to open and close the discharge nozzles 17A–17E, and a control means 30, illustrated in FIG. 3. For each nozzle there is a corresponding nozzle opening actuator and a nozzle closing actuator. Thus, FIG. 3 shows nozzle opening actuators 21A, 21B, 21C, 2D and 21E which are connected to control valves (not shown) for the discharge nozzles 17A, 17B, 17C, 17D and 17E respectively to actuate the nozzles to open discharge condition when desired. Similarly, nozzle closing actuators 22A, 22B, 22C, 22D and 22E are connected to the control valves for nozzles 17A–17E, respectively to close their respective discharge nozzles 17A–17E when desired. Each nozzle actuator may comprise a small electric motor, a solenoid, or like device.

Control means 30 includes a motor 31 which drives a shaft 41 connected to a series of control cams 32A, 32B, 32C, 32D and 32E, one cam for each discharge nozzle. Cams 32A–32E open and close a similar series of control switches 33A, 33B, 33C, 33D and 33E. Each control switch, in turn, energizes or deenergizes an associated relay coil in the series 34A, 34B, 34C, 34D and 34E. Each coil actuates one set or relay contacts 35A, 35B, 35C, 35D and 35E to control energization of the nozzle opening actuators 21A–21E and the nozzle closing actuators 22A–E, respectively, on a selective basis. Control means 30 is started and stopped by a main control switch 36. Individual actuator cutout switches 37A–E and 38A–E may be provided for the respective opening and closing nozzle actuators 21A–E and 22A–E.

For each revolution of shaft 41 and cams 32A–E, one complete cycle of system operation is carried out. A cycle may vary considerably in length; a typical cycle may be about 25 to 30 minutes. The elongated conduit 14 traverses field 11 over a much longer period of time, for example 14 hours. Thus, many repetitive cycles of the cams 32A–E occur during one complete revolution or one traversal of the segment of the field by conduit 14.

The actuators and controls shown in FIG. 3, apart from the system, constitute conventional commercial devices, and hence require no further description. Thus, the complete actuator means for discharge nozzle 17A, comprising the actuator motors 21A and 22B and relay 34A, 35A is available as a commercial unit, e.g. the EL-50 electric actuator of Jamesbury Corp., Worcester, Mass. Moreover, the complete on-off actuator is ordinarily sold assembled complete with a control valve, such as a Jamesbury or Salisbury double-seal ball valve. These and equivalent actuator means are quite suitable for use in the system of the invention.

Referring to FIG. 2, if the additional radial increment for each of the areas in bands 19A–19E is equal to the radius 20A of the inner band 19A, then the ratio of the radii 20A through 20E is 1:2:3:4:5. It can readily be demonstrated that for these dimensions the ratio of the areas 19A through 19E is 1:3:5:7:9. Since each of the nozzles 17A–17E distributes liquid suspension at the same rate, it is apparent that the nozzles must be maintained in open discharge condition in the same time ratio as the areas or bands that they are required to cover. Thus, for this particular example of a system constructed in accordance with the invention, nozzle 17B should discharge liquid suspension to band 19B over a time period, in each cycle of operation, that is three times the total period that nozzle 17A is open to discharge suspension to area 19A. By the same token, nozzle 17E must be in open discharge condition nine times as long as nozzle 17A if an even distribution is to be obtained.

FIG. 4 illustrates one timing cycle that may be employed for a liquid distribution system 10 as shown in FIGS. 1–3. In FIG. 4, the time during which each nozzle 17A–17E is in its open discharge condition is indicated by the cross-hatched portion of the timing chart; during intervening intervals, each nozzle is maintained in closed condition.

Another consideration affecting operation of system 10 is the number of discharge nozzles open at any given time. It is a relatively simple matter to arrange the control and actuator system illustrated in FIG. 3 to provide the desired ratio of discharge times for the various nozzles of the system without regard to how many nozzles are open simultaneously. However, a change in the number of discharge nozzles open at any given time may change the rate of discharge for the nozzles, particularly in a practical system in which conduit 14 has an internal diameter only 5 or 6 times larger than the discharge orifices of the individual nozzles. Thus, it is usually desirable to arrange the system control so that a constant number of nozzles are in open discharge condition at any given time during operation of the system.

The timing cycle illustrated in FIG. 4 provides for control of system 10 in strict accordance with the ratio for areas 19A–19E, as set forth above, and also maintains a constant number of discharge nozzles open at all times during operation of the system. With the timing cycle shown in FIG. 4, two of the discharge nozzles are open at any point in time during each operating cycle. The innermost nozzle 17A servicing band 19A is actuated to open condition for two 1-minute time increments during each cycle. The valve for nozzle 17B is opened 6 times in each cycle, for increments of one minute each. Nozzle 17C, servicing band 19C, is held open for a total of 10 1-minute increments in the overall 25 minute cycle. Valve 17D is maintained open to supply the liquid suspension to band 19D during a total of 14 1-minute increments in the complete 25 minute cycle. Valve 17E is open during most of the 25 minute cycle; the total number of 1-minute increments during which valve 17E is open to discharge the liquid suspension to area 19E is eighteen. Thus, the overall ratio is 2:6:10:14:18, corresponding precisely to the ratio of 1:3:5:7:9 required for even distribution throughout field 11.

Figure 1:
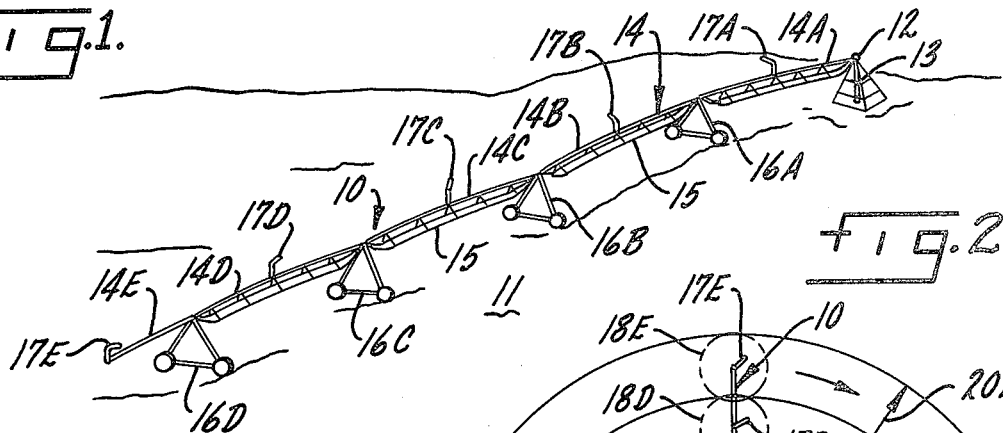
Figure 3:
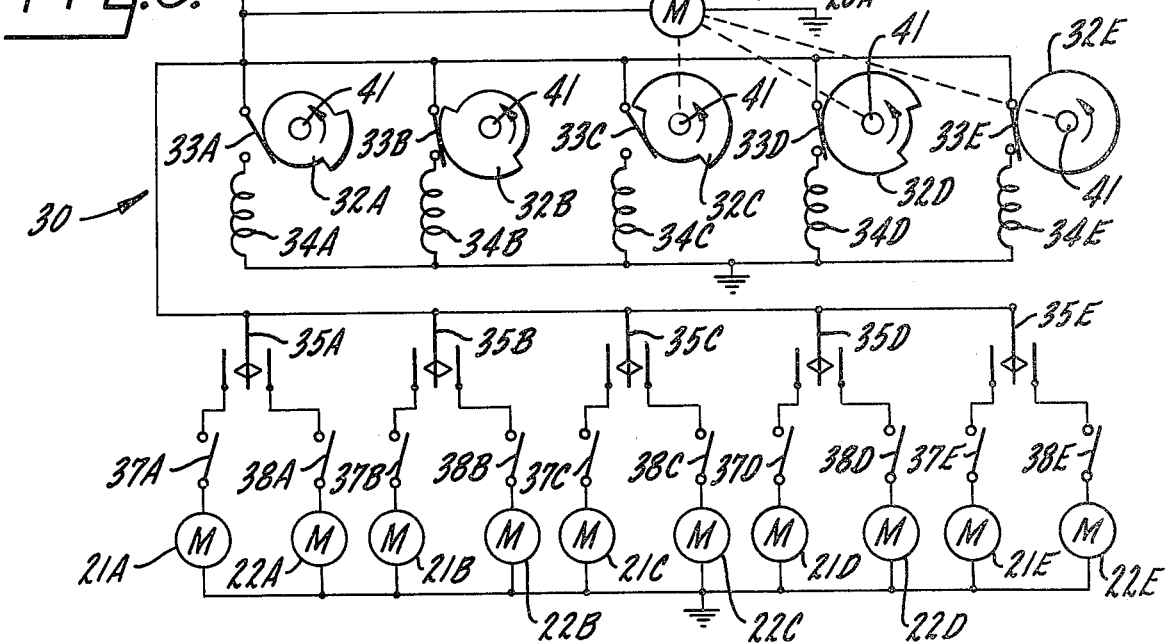
Figure 4:
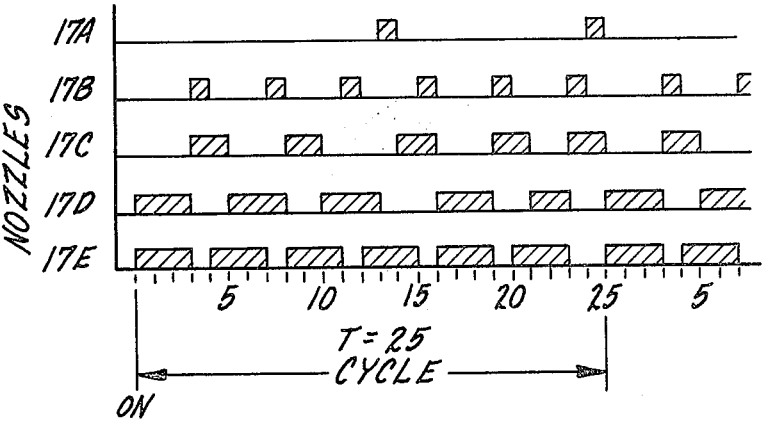

The timing cycle for system 10, FIGS. 1–3, that is shown in FIG. 4 is complicated by the fact that, although the areas of the bands 19A–19E are linearly related, the inner band 19A is only one-half the added incremental area for each outer band. Thus, even for the simple five-nozzle distribution system 10, it becomes necessary to adopt a 25 increment cycle in order to maintain just two nozzles in continuous operation throughout each increment of the cycle. If as many as three guns are to be maintained in operation, the timing cycle becomes even more complex than shown in FIG. 4, and may be difficult to maintain with a simple electromechanical control of the kind illustrated in FIG. 3. Of course, more sophisticated electrical or electronic sequence timing controls can be adopted to overcome this difficulty. On the other hand, a relatively minor modification of the pattern of nozzle locations and bands served by the distribution system is effective to simplify the band area relation and reduce the timing cycle complexity, as illustrated in FIGS. 5 and 6.

Figure 5:
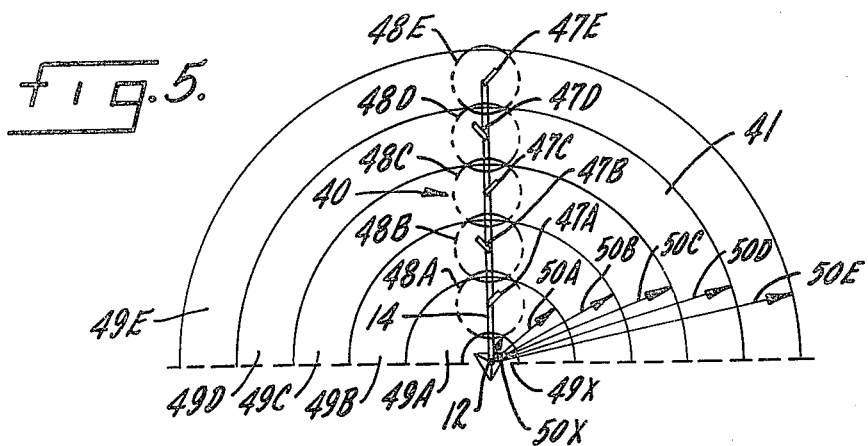
Figure 6:
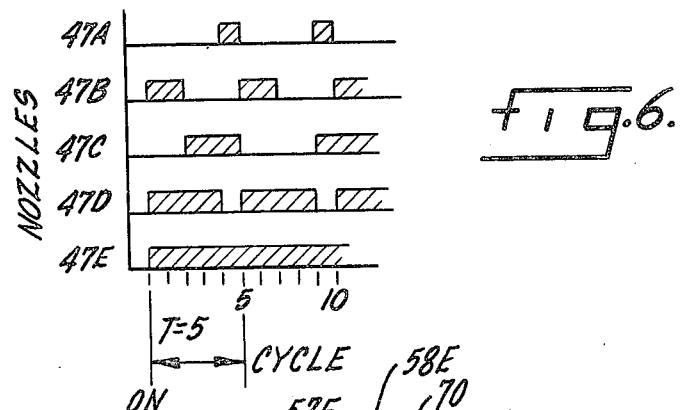

The distribution system 40 illustrated in FIG. 5 is similar in all respects to system 10 as described above except for the spacing of its nozzles 47A–47E along the conduit 14. Thus, in system 40 the innermost nozzle 47A is not located in a position where its distribution pattern 48A will encompass the area immediately adjacent pivot 12. Instead, nozzle 47A is displaced outwardly of pivot 12 by a distance equal to one and one-half times the spacing between nozzles along the remainder of conduit 14.

FIG. 5 illustrates the distribution patterns 48A–48E for the discharge nozzles 47A–47E respectively. The bands on the field 41 that are covered by nozzles 47A–47E are identified by reference characters 49A–49E respectively, and these bands are shown to have the radii 50A–50E. With the illustrated arrangement, there is a small inner band 49X of radius 50X that is not covered by distribution system 40.

If radius 50X is assumed to be of unit value, for purposes of comparison, and the increments of additional radius for each band are taken as twice that unit value, the ratio of the radii 50X–50E for field 41 (FIG. 5) is 1:3:5:7:9:11. On this basis, the ratio of the areas 49X–49E is 1:8:16:24:32:40. But the inner band 49X can be disregarded in establishing the operating cycle for distribution system 40, since it is not covered by the distribution pattern 48A for the innermost nozzle 47A. It is thus seen that the effective operating ratio for the portion of field 41 actually covered by the distribution system, areas 49A–49E, is really the direct linear series 1:2:3:4:5; the series would continue for any added bands beyond band 49E.

The arrangement illustrated in FIG. 5 simplifies the operating cycle for the distribution system and permits use of the simple cycle illustrated in FIG. 6. Here, the total number of time increments in each operational cycle is equal to the total number of discharge nozzles, in this instance five. The innermost nozzle 47A is actuated to its open discharge condition for a single increment of the operating cycle. Nozzle 47B is opened for two time increments in each cycle, nozzle 47C is actuated to open condition for three incremental intervals in each cycle, nozzle 47D is opened for four increments in each cycle, and nozzle 47E is maintained open for the full five increments in each operating cycle. For this system, in a typical installation, it may be convenient to use longer time increments than in the system of FIGS. 1–4; thus, 1 minute increments can well be applied to FIG. 4, and 3 to 5 minute increments to FIG. 6.

When system 40 is in operation, nozzle 47E is continuously maintained in its open discharge condition (see FIG. 6). Accordingly, the control illustrated in FIG. 3 can be simplified somewhat for the system 40 of FIGS. 5 and 6, eliminating cam 32E, control switch 33E, and the actuator comprising relay 34E, 35E and motors 21E and 22E. Furthermore, extensions of system 40 (FIG. 5) with additional nozzles permit the use of simpler time cycles, with less time increments than required for extended versions of system 10 (FIGS. 1–3), though it is not always possible to use a time cycle limited to the same number of increments as the number of nozzles if the number of open nozzles is to be held constant.

System 40, using the timing cycle of FIG. 6, has the further advantage that it maintains three of the nozzles in operation in each time increment. This allows for a somewhat higher rate of discharge than with system 10 and permits completion of distribution throughout field 41 in a somewhat shorter time.

The general expression for determining the number T of time increments required for even distribution of liquid over the field, with an even number G of nozzles on at all times during the operating cycle, is $$T = \frac{S}{G} \qquad (1)$$

where $S$ is the sum of the areas of the bands across which the liquid is distributed, divided by the lowest integral common denominator of those areas if there is such a common denominator other than one. If $T$, as calculated by equation (1) is not an integer, then it may be multipled by the lowest integer that will afford an integer for the actual number of time increments; other adjustments may be made to minimize the total number of time increments, as explained below.

Applying equation (1) to system 10, where $G = 2$, it is seen that $$S = 1+3+5+7+9 = 25$$

and $$T = \frac{S}{G} = \frac{25}{2} = 12.5$$

To obtain an integer for the number of time increments, $T$ is made equal to 25, resulting in a timing cycle as illustrated in FIG. 4.

By applying equation (1) to system 40, in which $G = 3$ and in which $$S = 1+2+3+4+5 = 15,$$

it is seen that $$T = \frac{S}{G} = \frac{15}{3} = 5$$

This affords a concise operating cycle, requiring only five time increments, as shown in FIG. 6.

Figure 7:
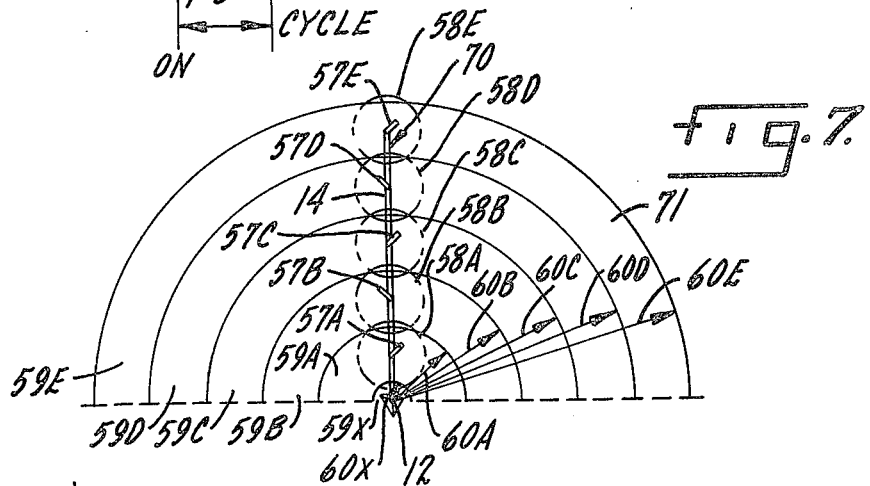

FIG. 7 illustrates a distribution system 70 covering a field 71 by discharge through five nozzles 57A–57E along a conduit 14 extending radially from a pivot 12 and having respective distribution patterns 58A–58E. As in system 40 (FIG. 5), a small band 59X of radius 60X is left uncovered by the distribution system 70, with bands 59A–59E having radii 60A–60E respectively covered by nozzles 57A–57E. In this instance, however the radius 60X of the untreated central area 59X is made quite small compared to the added radial increments of radii 60A–60E; if radius 60X is assumed to represent a unit value, radius 60A adds three units, radius 60B three more units, etc. This gives a ratio for the radii 60X through 60E of 1:4:7:10:13:16.

For these relative dimensions of field 71 and distribution system 70, the ratio of areas of bands 60X through 60E is 1:15:33:51:69:87. Since area 60X is not to be covered, it may be disregarded; accordingly, because the remaining area values have an integral common denominator of three, the working area ratio may be taken as 5:11:17:23:29. To then calculate the number of time increments for the operating cycle.

$$S = 5+11+17+23+29 = 85$$

If the number $G$ of nozzles to be in open discharge condition during each time increment is again taken as three, as in FIG. 4, then by equation (1)

$$T = \frac{S}{G} = \frac{85}{3} = 28\frac{1}{3}$$

Figure 8:
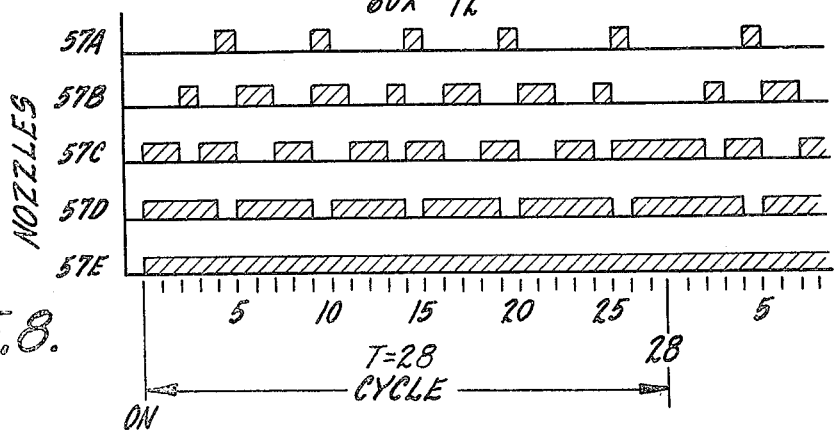

For these conditions, precise even distribution on field 71, using system 70, with three nozzles in operation at all times, requires an operating cycle of 3·28⅓, 85 increments. This is acceptable if rather sophisticated electrical or electronic controls are employed, but may be excessive for a simple electromechanical control such as that of FIG. 3. A close approximation of even distribution can be realized, however, by dropping the fraction one-third that appears in the calculated value of T and using an operating cycle of 28 time increments as shown in FIG. 8. With this operating cycle, the distribution of liquid suspension to the outer band 59E is slightly low, about 3.5% less than the requirement for complete uniformity. In most applications, this difference is not unacceptable.

Systems with larger numbers of discharge nozzles require no change in the described procedure for determining the operating cycle. For example, if additional nozzles and bands are added to system 40 and field 41 (FIG. 5) to a total number of eight, the actual area ratio would be extended to 1:8:16:24:32:40:48:56:64; with the inner band 59X again not covered by the system, the effective area ratio may be taken as 1:2:3:4:5:6:7:8. With these conditions, $$S = 1+2+3+4+5+6+7+8 = 36.$$

If the number $G$ of nozzles to be maintained open in each time increment is three, then the operating cycle, by equation (1), is:

$$T = \frac{S}{G} = \frac{36}{6} = 12 \text{ time increments.}$$

On the other hand, if four nozzles are to be kept in open discharge condition at all times, the operating cycle is:

$$T = \frac{S}{G} = \frac{36}{4} = 9 \text{ time increments.}$$

As another example, the system 40 of FIG. 5 can be extended to seven nozzles with an effective area ratio, ignoring the inner uncovered area, of 1:2:3:4:5:6:7, so that, $S = 28$. To keep four nozzles in operation, using equation (1), it is seen that $$T = \frac{S}{G} = \frac{28}{4} = 7 \text{ time increments.}$$

Applying the same conditions to system 10, FIGS. 1–3, the area ratio is 1:3:5:7:9:11:13, so that $S = 49$ and, by equation (1), $$T = \frac{S}{G} = \frac{49}{4} = 12\frac{1}{4}.$$

Here a 12 increment cycle can be utilized with a minor loss in uniformity, or a 49 increment cycle can be employed for maximum precision in uniform distribution.

In other embodiments, more than one discharge nozzle per band may be used, if desired. In that case, all the nozzles within a given band are turned off or on in conjunction with each other. For example, if there were 10 nozzles on an elongated conduit, they could be controlled as five bands with two nozzles in each band. However, this reduces the uniformity of distribution if the nozzles for a given band are displaced any substantial distance axially along conduit 14. The discharge nozzles should have substantially equal internal diameters and capacity, and the number of nozzles per band should be equal. In many instances it will be desirable to have the outermost discharge nozzle continuously open during operation, thereby allowing constant flow when the system is being used and avoiding the necessity for an outermost actuator control. For example, with the control illustrated in FIG. 3, as modified to fit the operating cycles of either of FIGS. 6 and 8, cam 32E is required to maintain control switch 33E closed at all times, so this cam and switch could be eliminated, along with relay 34E, 35E and actuators 21E, 22E, and replaced with a simpler control to maintain the outermost nozzle open whenever the system is in use.

Some discussion of parameters for a practical distribution system is desirable in order to afford a more complete disclosure of the invention. Taking system 40 (FIG. 5) as a basic example, the radius 50X in a given practical system may be 85 feed, making the radius 50A 255 feet, with each succeeding radius adding an increment of 170 feet. With a pressure of about 85 psig at pivot 12, employing nozzles with one inch orifices, and using the timing cycle shown in FIG. 5, system 40 can deliver about 750 gallons per minute to field 41. A conduit 14 of about six inches inside diameter is adequate. For larger fields, the delivery rate can easily be increased; if the length of conduit 14 is extended to about 1300 feet, for example, an overall discharge rate of about 1,000 gallons per minute may be desirable.

The nozzles used in these systems are preferably rotary high-volume broad-area discharge devices of the kind conventionally used as the "end guns" in center pivot irrigation systems. This kind of nozzle makes it possible to reduce the total number of discharge nozzles for a field of given radius far below the number usually used along the conduit of a center pivot irrigation apparatus. Simpler fixed nozzles and other narrow-area nozzles could be employed, but this expedient may add substantially to the complexity of the timing cycle and the control, and may create flooding problems, due to the requirement for large nozzle orifices to pass solid particles of substantial size.

It will be recognized that any of the systems described herein can be used for irrigation as well as for distribution of liquid suspensions (e.g., fertilizer suspensions) containing substantial quantities of entrained solid matter. The systems afford uniform distribution of water or water solutions, just as in the case of liquid-solid suspension.

I claim:

1. A center pivot agricultural liquid distribution system, of the kind comprising an elongated distribution conduit extending radially from a central pivot point in a field and drive means for pivoting the conduit about the pivot point to sweep at least a segmental circular area of the field, capable of substantially uniform distribution of a liquid suspension containing solid particles of given maximum dimension over the field area swept by the conduit, comprising:

a limited number of discharge nozzles mounted on and connected to the conduit at predetermined axially spaced intervals, each adapted to spray the liquid suspension outwardly of the conduit, the spray pattern of each nozzle extending at least to the edge of the spray pattern for the next adjacent nozzle, each discharge nozzle having an internal diameter larger than the aforesaid maximum particle dimension;

a corresponding number of nozzle actuators, one actuator being connected to each discharge nozzle to actuate that discharge nozzle between an open discharge condition and a closed condition;

and control means for operating the nozzle actuators in accordance with a repetitive timing cycle in which the first discharge nozzle, nearest the pivot point, is maintained in its open discharge condition for a limited incremental portion of each cyclic period, and each successive nozzle, outwardly of the pivot point, is maintained in its open discharge condition for a progressively longer portion of the cyclic period.

2. A center pivot agricultural liquid distribution system according to claim 1 in which the nozzles are equally spaced along the distribution conduit, in which the cyclic period includes a series of equal time increments at least equal in number to the number of nozzles, and in which each successive nozzle is maintained in its open discharge condition for at least one more time increment in each cyclic period than the next adjacent inward nozzle.

3. A center pivot agricultural liquid distribution system according to claim 2 in which all discharge nozzles have substantially equal limiting internal diameters and flow capacity, and distribute the liquid suspension over bands of approximately equal radial dimensions.

4. A center pivot agricultural liquid distribution system according to claim 3, in which a constant number of nozzles, substantially less than the total number of nozzles, is maintained in open discharge condition during each time increment of the operating cycle.

5. A center pivot agricultural liquid distribution system according to claim 4, in which the number T of time increments in each operating cycle is determined at least approximately in accordance with the relation $$T = \frac{S}{G},$$

where $S$ is the sum of the areas of the arcuate bands served by the individual discharge nozzles, reduced by division by the largest common denominator of those areas, and $G$ is the number of nozzles to be maintained in open discharge condition during each time increment of the operating cycle.

6. A center pivot agricultural liquid distribution system according to claim 4 in which the outermost nozzle actuator is continuously operated to maintain the outermost nozzle in its open discharge condition, allowing constant flow through the outermost discharge nozzle when the system is in use.

7. A center pivot agricultural liquid distribution system according to claim 4 in which the first discharge nozzle is displaced outwardly of the center pivot by a distance sufficient to leave a limited untreated area, around the center pivot, that does not receive a distribution of the liquid suspension.

8. A center pivot agricultural liquid distribution system according to claim 7 in which the untreated area has a radius of one-half the radial dimension of the band covered by the first discharge nozzle, so that the effective area ratio of the bands actually covered by the discharge nozzles, outwardly of the center pivot, corresponds to the series 1:2:3:4:5:6:7 . . . .

9. A center pivot agricultural liquid distribution system according to claim 8 in which the interval during which the first discharge nozzle is open is a given number of time increments in each operating cycle, and each successive nozzle is maintained in its open discharge condition for the same number of time increments more than the next adjacent inward nozzle.

10. A center pivot agricultural liquid distribution system according to claim 4 in which the innermost nozzle distributes the liquid suspension in a band that extends to the center pivot, and in which the limited incremental portion of the cyclic period for the first discharge nozzle is a given number of time increments, and each successive nozzle is maintained in its open discharge condition for twice that number of time increments more than the next adjacent inward nozzle, in accordance with an area and time increment ratio of 1:3:5:7:9 . . . .

* * * * *